(12) United States Patent
Mueller

(10) Patent No.: US 11,691,629 B2
(45) Date of Patent: Jul. 4, 2023

(54) METHOD FOR POPULATING A CONTROLLER WITH DATA, AND METHOD FOR OPERATING A MOTOR VEHICLE

(71) Applicant: Bayerische Motoren Werke Aktiengesellschaft, Munich (DE)

(72) Inventor: Jonas Mueller, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/279,698

(22) PCT Filed: Aug. 12, 2019

(86) PCT No.: PCT/EP2019/071611
§ 371 (c)(1),
(2) Date: Mar. 25, 2021

(87) PCT Pub. No.: WO2020/064203
PCT Pub. Date: Apr. 2, 2020

(65) Prior Publication Data
US 2022/0032916 A1    Feb. 3, 2022

(30) Foreign Application Priority Data

Sep. 26, 2018 (DE) .................... 10 2018 216 515.7

(51) Int. Cl.
*B60W 30/20* (2006.01)
*G06N 7/00* (2023.01)
(Continued)

(52) U.S. Cl.
CPC ............ *B60W 30/20* (2013.01); *B60W 10/06* (2013.01); *B60W 10/08* (2013.01); *G06N 7/00* (2013.01);
(Continued)

(58) Field of Classification Search
CPC ............ B60W 30/20; B60W 2510/10; B60W 2030/206; B60W 2050/0041;
(Continued)

(56) References Cited

U.S. PATENT DOCUMENTS

| 8,498,789 B2 | 7/2013 | Chinbe et al. |
| 2012/0101705 A1* | 4/2012 | Templin ................ B60W 30/20 701/99 |

(Continued)

FOREIGN PATENT DOCUMENTS

| DE | 10 2004 039 756 A1 | 2/2006 |
| DE | 10 2010 029 706 A1 | 12/2011 |

(Continued)

OTHER PUBLICATIONS

English translation of DE102015108067A1; http://translationportal.epo.org; Jun. 23, 2022 (Year: 2022).*

(Continued)

*Primary Examiner* — Roger L Pang
(74) *Attorney, Agent, or Firm* — Crowell & Moring LLP

(57) ABSTRACT

A method for populating a controller for a motor vehicle with data includes providing a controller with a storage device, and generating a projected mathematical model of at least one section of a powertrain, including a transmission. The projected mathematical model describes the section of the powertrain with a gear ratio of 1 and is applicable to different transmissions. The projected mathematical model is stored in the storage device of the controller. A motor vehicle is also provided and operated accordingly.

10 Claims, 2 Drawing Sheets

(51) Int. Cl.
  *B60W 10/06*   (2006.01)
  *B60W 10/08*   (2006.01)
  *B60W 50/00*   (2006.01)

(52) U.S. Cl.
  CPC . *B60W 2050/0041* (2013.01); *B60W 2510/10* (2013.01); *B60W 2510/1005* (2013.01); *B60W 2710/06* (2013.01); *B60W 2710/08* (2013.01)

(58) Field of Classification Search
  CPC ................ B60W 10/06; B60W 10/08; B60W 2510/1005; B60W 2710/06; B60W 2710/08; G06N 7/00
  USPC ................................................ 477/3; 701/54
  See application file for complete search history.

(56) References Cited

U.S. PATENT DOCUMENTS

| | | | |
|---|---|---|---|
| 2013/0311034 A1* | 11/2013 | Falkenstein | B60W 20/00 701/33.7 |
| 2019/0047544 A1* | 2/2019 | Ye | B60W 20/11 |
| 2019/0291737 A1* | 9/2019 | Chen | B60W 10/02 |

FOREIGN PATENT DOCUMENTS

| | | | |
|---|---|---|---|
| DE | 11 2009 004 495 B4 | 9/2012 | |
| DE | 10 2015 108 067 A1 | 11/2015 | |
| WO | WO-2019219698 A1 * | 11/2019 | ............. B60K 28/16 |

OTHER PUBLICATIONS

English translation of DE102004039756A1; http://translationportal.epo.org; Jun. 23, 2022 (Year: 2022).*

PCT/EP2019/071611, International Search Report dated Dec. 13, 2019 (Two (2) Pages).

German Search Report issued in German application No. 10 2018 216 515.7 dated May 15, 2019, with Statement of Relevancy (Eight (8) pages).

Crowther et al., "Torsional finite elements and nonlinear numerical modelling in vehicle powertrain dynamics", *Journal of Sound and Vibration*, Elsevier, Amsterdam, NL, vol. 284, No. 3-5, Jun. 21, 2005, pp. 825-849, XP004887922.

Balau et al., "One Step Ahead MPC for an Automotive Control Application", *Engineering of Computer Based Systems (ECBS-EERC), 2011 $2^{ND}$ Eastern European Regional Conference on the, IEEE*, Sep. 5, 2011, pp. 61-70, XP032058460.

* cited by examiner (a)

(b)

METHOD FOR POPULATING A CONTROLLER WITH DATA, AND METHOD FOR OPERATING A MOTOR VEHICLE

BACKGROUND AND SUMMARY OF THE INVENTION

The invention relates to a method for populating a controller for a motor vehicle with data and to a method for operating a motor vehicle.

Generally, motor vehicles can differ, inter alia, in the design of the drive train which connects an electric motor and/or internal combustion engine to wheels of the motor vehicle in a force-transmitting fashion, in particular in the case of hybrid vehicles. The drive trains differ here, inter alia, with respect to transmissions which are installed therein and which convert a rotational speed of a driveshaft connected to the electric motor and/or internal combustion engine to a rotational speed of the wheels.

In order to control certain motor vehicles, it is necessary for certain parameters of the drive train to be stored in a corresponding controller. The parameters are, for example, the transmission ratio of the transmission and/or masses of sections or parts of the drive train.

Since these parameters differ from one type of vehicle to another, a separate set of these parameters has to be produced and validated for each type of vehicle, which, in view of the continuously increasing variety of types of vehicle, means a large amount of expenditure on development and testing, making the costs correspondingly high.

The object of the invention is to provide a method for populating a controller with data and a method for operating a motor vehicle with which the disadvantages from the prior art are overcome.

The object is achieved according to the invention by means of a method for populating a controller for a motor vehicle with data comprising the following steps: a controller with a storage device is provided. A projected mathematical model of at least one section of a drive train is produced, wherein the section of the drive train comprises a transmission. In this context, the projected mathematical model describes the section of the drive train with a transmission ratio of 1 and can be used universally in different transmissions. The projected mathematical model is then stored in the storage device of the controller.

The term "populating the controller with data" is to be understood here and below as meaning that data of any desired format, computer programs and/or control instructions are stored or saved in the controller, in particular in the storage device of the controller.

According to the invention, a mathematical model which can be used universally and which can be used independently of the specific physical configuration of the drive train for, as it were, any drive train, is therefore provided. Therefore, it is no longer necessary to determine and validate a separate set of system parameters of the drive train for each type of vehicle and to populate the controller with said system parameters. Instead, the corresponding controller can be used universally for different types of vehicle, as a result of which the expenditure on development and tests is considerably reduced. In this respect, the costs can also be significantly reduced, in particular when there is a large variety of motor vehicles which comprise different drive trains but controllers of the same design.

According to one requirement of the invention, the section of the drive train is modeled as at least two masses which are coupled to one another via a spring element and/or via a damping element. In other words, the section of the drive train which comprises the transmission is modeled as a damped, harmonic oscillator. If the drive train comprises a plurality of transmissions, the model can also comprise a plurality of masses which are connected in series and/or parallel and are coupled in pairs in each case via a spring element and/or via a damping element. The modeling as a damped, harmonic oscillator passes on all the important system parameters (inter alia damping and elasticity of the transmission) with sufficient precision and also permits simple generation of system matrices and a rapid solution to the motion equations and/or state equations of the coupled masses, in particular a numerical solution of the motion equations and/or of the state equations. This permits a solution of the motion equations and/or of the state equations of the coupled masses in real time.

The object is also achieved according to the invention by a method for operating a motor vehicle, wherein the motor vehicle comprises a drive train with at least one transmission having a transmission ratio, and a controller which is populated with data according to a method described above, comprising the following steps: firstly, parameters and/or variables of the projected mathematical model are scaled on the basis of an actual transmission ratio of the at least one transmission. At least one system matrix is then generated on the basis of the projected mathematical model and the scaled parameters and/or variables.

The method according to the invention is therefore based on the concept of adapting the parameters and/or variables of the universal mathematical model on the basis of the real properties of the transmission, to be more precise on the basis of the actual transmission ratio of the transmission. As a result, the controller can easily be adapted to the specific, actual physical configuration of the drive train of the respective motor vehicle and can therefore be used universally for different types of vehicle.

The parameters and/or variables are preferably scaled here according to a predefined schema. Each parameter to be scaled and each variable to be scaled are permanently assigned a formula relationship which describes the dependence of the corresponding scaled parameters or variables on the actual transmission ratio of the transmission.

Motion equations and/or state equations which result from the mathematical model of the drive train can be solved, in particular numerically, on the basis of the system matrix.

The parameters and/or variables are preferably scaled in such a way that the projected mathematical model models the at least one section of the drive train. In other words, the projected mathematical model with the scaled parameters and/or variables is equivalent to a "real" mathematical model of the section of the drive train which considers the transmission ratio. However, a suitable mathematical model does not have to be produced for each drive train. It is instead sufficient to adapt the parameters and/or variables of the universal projected mathematical model according to the predefined schema. This considerably reduces the expenditure of the application, as a result of which the costs can be correspondingly lowered.

In the text which follows, the term "controlled on the basis of the system matrix" is to be understood as meaning that the system matrix itself, the solutions of the corresponding motion equations and/or the solutions of the corresponding state equations are used for the control.

One aspect of the invention provides that at least one motor vehicle function is controlled on the basis of the system matrix. In particular, a drive function, a steering function and/or an interference suppression function are controlled on the basis of the system matrix. The drive function is, for example, to provide a predefined torque and/or to divide a torque between an internal combustion engine and an electric motor. The steering function can be to provide a predefined auxiliary torque for assisting the steering and/or to provide an adaptive steering sensation. The interference suppression function comprises, for example, suppressing rotational vibrations in the drive train and/or suppressing disruptive reactions of the drive train on a steering wheel (e.g. "juddering on a smooth road").

According to a further aspect of the invention, a drive machine of the motor vehicle is controlled on the basis of the system matrix. The drive machine is, for example, an internal combustion engine and/or an electric motor, wherein the controller can be an engine controller or motor controller. Targeted control of the drive of the motor vehicle makes it possible, for example, to actively damp rotational vibrations in the drive train.

Another aspect provides that an active damping device of the motor vehicle is controlled. In particular, this is a damping device which actively damps rotational vibrations in the drive train, which can considerably increase the driving comfort.

The actual value of the transmission ratio of the transmission, in particular a current actual value of the transmission ratio, is preferably transmitted to the controller. In other words, the actual value of the transmission ratio does not have to be stored in the controller manually and for each type of motor vehicle individually. Instead, the controller receives the actual value of the transmission ratio directly from the transmission, in particular from a transmission controller. If the transmission has a plurality of gears or gear speeds, the current actual value of the transmission ratio can also always be transmitted to the controller, as a result of which the parameters and/or variables of the projected mathematical model can always be adapted to the current value of the transmission ratio.

The actual value of the transmission ratio can, alternatively or additionally, be stored in the controller during the manufacture of the motor vehicle. This is particularly advantageous when the transmission has just one fixed transmission ratio and/or when the transmission does not have a transmission controller.

If the transmission has a plurality of gears or gear speeds, the actual value of the transmission ratios of the individual gears can also be stored in the controller and the controller then receives from the transmission for example just one signal indicating which gear is currently engaged. In this case also, the parameters and/or variables of the projected mathematical model are always adapted to the current value of the transmission ratio.

The object is also achieved according to the invention by a motor vehicle having a drive train which comprises at least one transmission having a transmission ratio, and a controller which is populated with data according to a method described above for populating a controller with data, wherein the motor vehicle is designed to carry out a method as described above for operating a motor vehicle. With respect to the advantages, reference is made to the above explanations.

BRIEF DESCRIPTION OF THE DRAWINGS

Further advantages and properties can be found in the following description and the appended drawings to which reference is made.

DETAILED DESCRIPTION OF THE DRAWINGS

Figure 1:
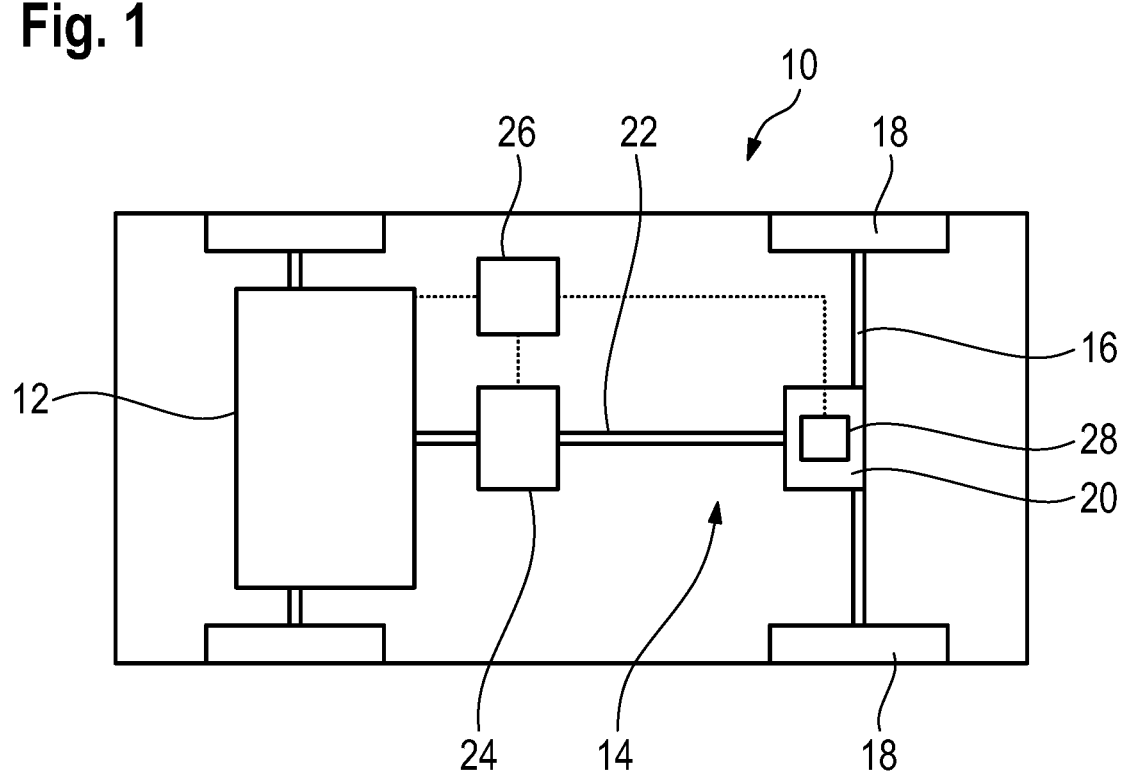
FIG. 1 shows a schematic view of a motor vehicle according to the invention.

FIG. 1 shows a schematic view of a motor vehicle 10 which has a drive machine 12 and a drive train 14 which connects the drive machine 12 to at least one axle of the motor vehicle 10 in a force-transmitting fashion. In the example shown, the drive machine 12 is connected to a rear axle 16 of the motor vehicle.

The motor vehicle 10 is therefore embodied with a rear-wheel drive. Alternatively, or additionally, the motor vehicle 10 can, however, also have a front-wheel drive.

The drive machine 12 can comprise an internal combustion engine and/or an electric motor. In other words, the motor vehicle 10 can be embodied as a vehicle with an internal combustion drive or as an electric vehicle or as a hybrid vehicle which comprises an internal combustion engine and an electric motor.

The drive train 14 comprises at least one transmission 20 which has a transmission ratio i. In the example illustrated in FIG. 1, the transmission 20 converts a rotational speed of a driveshaft 22 assigned to the drive machine 12 to a rotational speed of the rear wheels 18. In particular, the transmission 20 has a plurality of gears, wherein the transmission ratio i then depends on the gear which is engaged.

If the motor vehicle is embodied as a hybrid vehicle, the drive train 14 can also comprise a transfer box which transmits torques from the internal combustion engine and electric motor to the driveshaft 22.

A damping device 24 which is configured to actively damp disruptive rotational vibrations in the drive train 14 is optionally provided in the drive train 14.

In addition, the motor vehicle 10 has a controller 26 which is configured to control at least one motor vehicle function.

In particular, the controller 26 is an engine controller or motor controller and/or a controller of the damping device 24. Consequently, the controller 26 can be connected to the drive machine 12 and/or to the damping device 24 in a signal-transmitting fashion.

The term "connected in a signal-transmitting fashion" is understood here to mean any type of cable-less or cable-bound connection which is suitable for transmitting data and/or signals. Signal-transmitting connections are indicated by dotted lines in FIG. 1.

Alternatively, or additionally, the controller 26 is designed to control a drive function, a steering function and/or an interference suppression function. The drive function is, for example, to provide a predefined torque by the drive machine and/or to divide a torque between an internal combustion engine and an electric motor. The steering function can be to provide a predefined auxiliary torque for assisting the steering and/or to provide an adaptive steering sensation. The interference suppression function comprises, for example, suppressing rotational vibrations in the drive train 14 and/or suppressing disruptive reactions of the drive train on a steering wheel, for example "juddering on a smooth road."

In addition, the controller 26 can be connected in a signal-transmitting fashion to the transmission 20, in particular to a transmission controller 28.

The controller can preferably be used universally for various types of drive trains, in particular for drive trains 14 with a different transmission ratio i.

Figure 2:
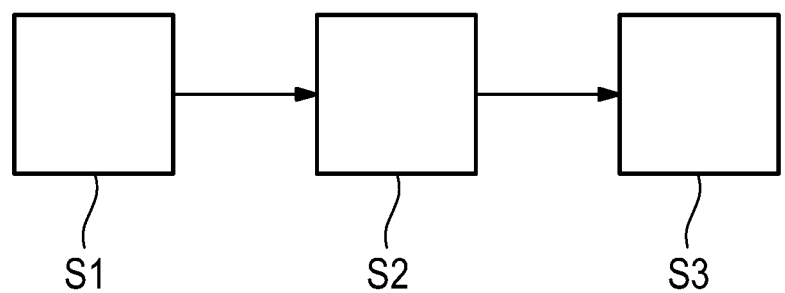
FIG. 2 shows a schematic flow diagram of the steps of a method according to the invention for populating a controller for a motor vehicle with data.

For this purpose, a projected mathematical model of the drive train 14 is stored in a storage device of the controller 26, wherein the controller 26 is populated with data by means of the method described below with reference to FIGS. 2 and 3.

Firstly, the controller 26 is provided (Step S1). Secondly, a projected mathematical model of a section of the drive train 14 is produced which comprises the transmission 20 (Step S2).

The projected mathematical model describes here the section of the drive train 14 with a transmission ratio of i=1. In other words, in the projected mathematical model the transmission 20 does not implement either a step up or a step down of the rotational speed or of the torque.

For the sake of better understanding, step S1 will be explained in even more detail on the basis of the exemplary mathematical model illustrated in FIG. 3.

Figure 3:
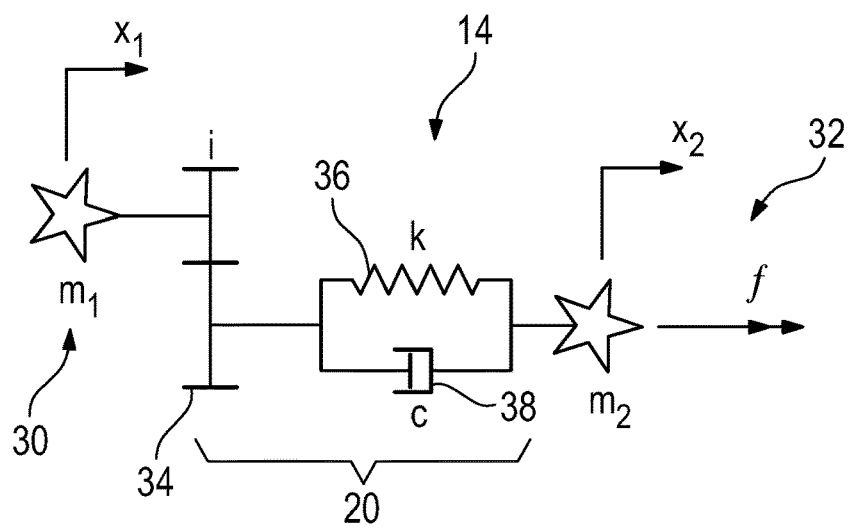
FIG. 3(a) shows a mathematical model of a drive train.
FIG. 3(b) shows a projected mathematical model of a drive train.
Figure 3:
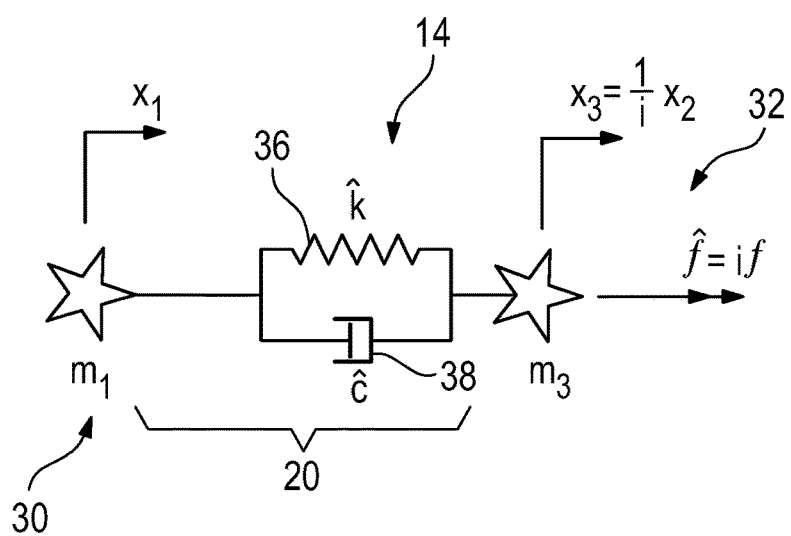

In FIGS. 3 (a) and (b), which illustrate a mathematical model of the drive train 14 or a projected mathematical model of the drive train 14, the drive train 14 is in each case modeled as a damped harmonic oscillator.

A first mass $m_1$ represents here an effective mass of the components on a first side 30 of the transmission 20, while a second mass $m_2$ represents an effective mass of the components on a second side 32 of the transmission 20.

The two masses $m_1$, $m_2$ are coupled to one another by a transmission stage 34 with a transmission ratio i, a spring element 36 with a spring constant k, and a damping element 38 with a damping constant c. In addition, a torque f engages on the second mass $m_2$.

The transmission ratio i of the transmission stage 34 occurs here in such a way that in FIG. 3 (a) the rotational speed is multiplied by i from left to right, and the torque is divided by i from left to right.

The transmission ratio 34, the spring element 36 and the damping element 38 together form a model of the transmission 20.

The following coupled motion equations for the coordinates $x_1$ and $x_2$ of the masses $m_1$ and $m_2$ can be derived from the mathematical model shown in FIG. 3 (a):

$$m_1\ddot{x}_1 + ci(i\dot{x}_1 - \dot{x}_2) + ki(ix_1 - x_2) + 0$$

$$m_2\ddot{x}_2 + ci(\dot{x}_2 - i\dot{x}_1) + k(x_2 - ix_1) + f$$

The projected mathematical model from FIG. 3 (b) corresponds precisely to the mathematical model according to FIG. 3 (a), but with the fixed selection i=1 and a modeled spring constant $\hat{k}$ and a modified damping constant $\hat{c}$. The motion equations are correspondingly $$m_1\ddot{x}_1 + \hat{c}(\dot{x}_1 - \dot{x}_3) + \hat{k}(x_1 - x_3) = 0$$

$$m_3\ddot{x}_3 + \hat{c}(\dot{x}_3 - \dot{x}_1) + \hat{k}(x_3 - x_1) = \hat{f}$$

It is to be noted once again here that the mathematical model described above is only an example for the purpose of illustration. Of course, any suitable mathematical model for the drive train 14 can be selected.

However, the mathematical model always includes motion equations and/or state equations which describe a rotational movement of shafts above and below the transmission 20. In an analogous fashion, the projected mathematical model always corresponds to the mathematical model of the drive train 14, but with a transmission ratio i=1.

The projected mathematical model, in particular the associated motion equations and/or state equations, are stored in a storage device of the controller 26 (Step S3).

The controller 26 can then be used universally for various types of drive trains, in particular for drive trains 14 with a different transmission ratio i.

Figure 4:
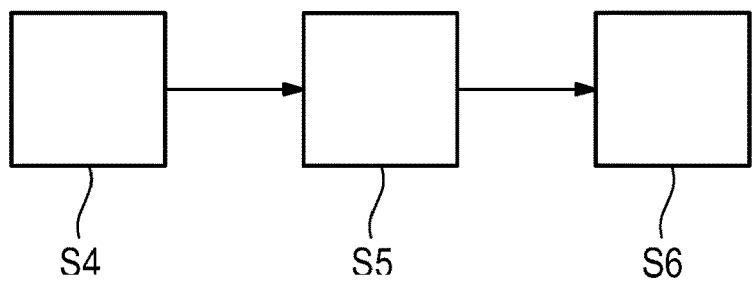
FIG. 4 shows a schematic flow diagram of the steps of a method according to the invention for operating a motor vehicle.

For this purpose, only the method steps described below with reference to FIGS. 3 and 4 have to be carried out.

Firstly, parameters and/or variables of the projected mathematical model are scaled on the basis of an actual transmission ratio of the transmission 20 (Step S4), specifically in such a way that the projected mathematical model models the respective section of the drive train 14 which contains the transmission 20. In other words, a projected mathematical model with scaled parameters and/or variables is equivalent to a "real" mathematical model of the section of the drive train 14 which considers the transmission ratio.

This step will be explained in more detail once more with reference to the model in FIG. 3.

By comparing the abovementioned coupled motion equations for the coordinates $x_1$ and $x_2$ from the "real" mathematical model and the coupled motion equations for the coordinates $x_1$ and $x_3$ from the projected mathematical model it becomes apparent that using the following scalings the projected mathematical model is equivalent to the "real" model:

$$x_3 = \frac{1}{i}x_2; \hat{f} = if; \hat{c} = i^2c; \hat{k} = i^2k; m_3 = i^2m_2.$$

Once again, the illustrated model is also to be understood here as being a purely illustrative example of the basic principle that the parameters and/or variables of the projected mathematical model are scaled in order to model the real drive train 14.

For this projection of the real drive train 14, the actual value of the transmission ratio i is clearly necessary.

The actual value of the transmission ratio i, in particular a current actual value of the transmission ratio i, is preferably transmitted from the transmission 20 to the controller 26. In other words, the actual value of the transmission ratio i is not stored in the controller 26 manually and for each motor vehicle 10 individually.

Instead, the controller 26 receives the actual value of the transmission ratio directly from the transmission 20, in particular from the transmission controller 28. If the transmission 20 has a plurality of gears, the current actual value of the transmission ratio i can also be transmitted to the controller 26.

Alternatively, or additionally, the actual value of the transmission ratio i can be stored in the controller 26 during the manufacture of the motor vehicle 10.

At least one system matrix is then generated (Step S5) on the basis of the projected mathematical model and the scaled parameters and/or variables. Furthermore, motion equations and/or state equations which result from the mathematical model of the drive train are solved, in particular numerically (Step S6).

At least one of the vehicle functions described above can then be controlled by the controller 26 on the basis of the system matrix.

In this context, the term "controlled on the basis of the system matrix" is to be understood as meaning that the system matrix itself, the solutions of the corresponding motion equations and/or the solutions of the corresponding state equations are used for the control.

What is claimed is:

1. A method for populating a controller for a motor vehicle with data, the method comprising:
   providing the controller with a storage device;
   producing a projected mathematical model of at least one section of a drive train with a transmission, wherein the projected mathematical model describes the drive train in a state with a transmission ratio of 1 and not other than 1; and
   storing the projected mathematical model in the storage device of the controller,
   wherein the projected mathematical model includes parameters and/or variables that are scalable according to actual transmission ratio information received from the motor vehicle so as to render the projected mathematical model reflective of an actual transmission of the motor vehicle having an actual transmission ratio other than 1 after the projected mathematical model is stored in the storage device.

2. The method according to claim 1, wherein the section of the drive train is modeled as at least two masses coupled to one another via a spring element and/or via a damping element.

3. A method for operating a motor vehicle, wherein the motor vehicle comprises a drive train with at least one transmission, and a controller, the method comprising:
   producing a projected mathematical model of at least one section of the drive train, wherein the projected mathematical model describes the drive train in a state with a transmission ratio of 1 and not other than 1;
   storing the projected mathematical model in a storage device of the controller;
   after the projected mathematical model is stored in the storage device, scaling parameters and/or variables of the projected mathematical model according to an actual transmission ratio of the at least one transmission such that the projected mathematical model models the at least one transmission, the at least one transmission having the actual transmission ratio other than 1; and
   generating at least one system matrix on the basis of the projected mathematical model and the scaled parameters and/or variables.

4. The method of claim 3, wherein the parameters and/or variables are scaled such that the projected mathematical model models the at least one section of the drive train.

5. The method of claim 3, wherein at least one motor vehicle function is controlled on the basis of the system matrix.

6. The method of claim 3, wherein a drive machine of the motor vehicle is controlled based on the system matrix.

7. The method of claim 3, wherein an active damping device of the motor vehicle is controlled based on the system matrix.

8. The method of claim 3, wherein the actual value of the transmission ratio of the transmission is a current actual value of the transmission ratio transmitted to the controller.

9. The method of claim 3, wherein the actual value of the transmission ratio is stored in the controller during the manufacture of the motor vehicle.

10. A motor vehicle comprising:
    a drive train comprising:
       a transmission having an actual transmission ratio, and
       a controller,
    wherein the motor vehicle is configured to carry out the method of claim 3.

* * * * *